US011889792B1

(12) United States Patent
Lucas

(10) Patent No.: US 11,889,792 B1
(45) Date of Patent: Feb. 6, 2024

(54) MODULAR WEED BARRIER MAT USING UPCYCLED TIRES

(71) Applicant: Robert T Lucas, Bemus Point, NY (US)

(72) Inventor: Robert T Lucas, Bemus Point, NY (US)

( * ) Notice: Subject to any disclaimer, the term of this patent is extended or adjusted under 35 U.S.C. 154(b) by 200 days.

(21) Appl. No.: 17/584,230

(22) Filed: Jan. 25, 2022

(51) Int. Cl.
| | |
|---|---|
| *A01G 13/02* | (2006.01) |
| *B32B 3/14* | (2006.01) |
| *B32B 7/08* | (2019.01) |
| *B32B 25/04* | (2006.01) |
| *B32B 3/26* | (2006.01) |

(52) U.S. Cl.
CPC ............ *A01G 13/0268* (2013.01); *B32B 3/14* (2013.01); *B32B 3/266* (2013.01); *B32B 7/08* (2013.01); *B32B 25/042* (2013.01); *B32B 2410/00* (2013.01)

(58) Field of Classification Search
CPC ................ A01G 13/0268; A01G 13/02; A01G 13/0256; A01G 13/0281; A01G 13/0275; B32B 3/14; B32B 3/266; B32B 25/042
See application file for complete search history.

(56) References Cited

U.S. PATENT DOCUMENTS

| | | | |
|---|---|---|---|
| 2,662,343 A | 12/1953 | Rice | |
| 4,349,989 A | 9/1982 | Snider | |
| 5,285,594 A | 2/1994 | Penny | |
| 5,323,557 A | 6/1994 | Sonntag | |
| 5,379,558 A | 1/1995 | Mason, III | |
| 5,389,116 A | 2/1995 | Byrd | |
| 5,509,231 A | 4/1996 | Marcoux | |
| 5,586,753 A | 12/1996 | Michiaels | |
| 6,446,400 B1 * | 9/2002 | Block | E01F 15/0469 47/32 |
| 6,466,400 B1 | 9/2002 | Block | |
| 9,273,436 B1 | 3/2016 | Kulp | |
| 2004/0197146 A1 * | 10/2004 | Zingg | B44F 9/04 404/35 |
| 2009/0158646 A1 * | 6/2009 | Moore, Jr. | B32B 7/12 156/60 |

* cited by examiner

*Primary Examiner* — Kristen C Hayes
(74) *Attorney, Agent, or Firm* — Karen Tang-Wai Sutton

(57) ABSTRACT

A modular weed barrier mat comprised of a double layer of tire tread sections cut from used tires arranged so that the lengths of the upper sections are perpendicular to those of the lower sections. A pair of upper sections are positioned in spaced apart relationship so as to form a gap, with a central slit array cut into two immediately adjacent lower sections accessible within the gap. A slit cut through a width of one lower section directly below one of the upper sections on either side of the central slit array allows a post to be moved into the slit and then positioned in the central slit array. Corrosion resistant fasteners are removed and replaced as needed to allow the mat to be installed or removed as desired. One embodiment features lower and upper lap portions on opposite sides of the mat for modular installation.

22 Claims, 10 Drawing Sheets

MODULAR WEED BARRIER MAT USING UPCYCLED TIRES

CROSS-REFERENCE TO RELATED APPLICATIONS

NA

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of weed barrier mats, specifically weed barrier mats made with recycled tires.

Background Art

Weeds are unwanted vegetation of any type and can include grasses, native and exotic plants, shrubby growth, and saplings, along with "traditional" weeds such as dandelions and ground ivy. Weeds invariably grow along fence lines, posts, guardrails, and other structures along roads and highways, as well as along rail lines. Aside from being unsightly, weed removal along roadways is a safety issue: weeds reduce barrier visibility and interfere with proper sheet flow drainage of water off road surfaces. Weeds growing under guard rails allow debris buildup, and encourages rills or small channels of water, to form around and behind debris deposits, leading to uncontrolled runoff and erosion. Weeds growing around railway lines, particularly shrubby vegetation and saplings along the shoulder of the railway lines can interfere with proper maintenance of the lines.

Commonly, road crews remove weeds by mowing, hand trimming and herbicide application, with herbicide application being most time and cost effective and thus the most popular method of weed control. The downside of herbicides however is that over time, herbicide runoff and residues can end up in aquatic systems and concentrate in soils, with deleterious effects to ecosystems.

Many attempts have been made to reduce herbicide use along road guard rails and signposts using mechanical weed barriers positioned on the ground surface and yet this problem has proven to be surprisingly difficult to resolve in a cost and time effective way.

U.S. Pat. No. 9,273,436 (Kulp) describes a common weed barrier comprised of recycled rubber from used tires ground into small pieces, mixed with resins and other chemicals and poured into mats where one of several premolded cutout areas along one edge of a mat is removed using a utility knife to allow the mat to be fitted around the post, and a second mat is positioned next to the cut mat such that the edges of the second mat overlap those of the first mat, creating a lap joint. The lap joint is sealed using a permanent adhesive. A gasket having a central opening and slit cut through the outermost edge of the gasket and ending at the central opening is positioned over the lap joint and around the post or rail support that is then screwed and adhered into place. The gasket allows for a more secure fit around the post and reinforces the lap joint. This current system is sold by TrafFix Devices Inc. of San Clemente CA. The mat and gasket are manufactured products that are poured, meaning that even if they use recycled materials such as rubber, those materials must first undergo processing that adds to the expense of the product and environmental impact from chemical processing required to break bonds created by vulcanization of rubber products. While recycling tires is highly desired, the Kulp patent in fact is adding to the carbon footprint of these tires.

Like Kulp, U.S. Pat. No. 6,446,400 (Block), U.S. Pat. No. 5,285,594 (Penny), U.S. Pat. No. 5,379,558 (Mason), U.S. Pat. No. 5,509,231 (Marcoux), and U.S. Pat. No. 5,586,753 (Michiaels), detail multi-mat solutions, some including lap joints that are tapered to allow for a flatter joint profile. All require the mats to be secured to each other, for instance, by adhesive or fasteners and typically requiring both. Some use stakes to further secure the mats to the ground. Stakes are notoriously difficult to maintain in temperate climates due to frost heave and loose stakes provide tripping hazards as well as create dangers for mowers. Many of the mats described by the prior art are poured mats with pre-molded score lines to facilitate cutting and installation around posts. Some like Block teach the use of comminuted tires, which is the grinding up of used tires into tiny fragments which are then mixed with other materials, heated and molded into mats, which effectively recycles the tires but ultimately requires more resources and adds to the tires' environmental impact and carbon footprint.

Recycled tire products currently all involve grinding, cutting, chipping or otherwise fragmenting existing tires into smaller pieces that are added to another binder material, heated to a liquid state, and poured into desired products, such as playground surfaces and rubber tree mulch rings. While these products do indeed recycle used tires, they are also not without environmental impact. Another concern is that these new mats are attractive and thus may be susceptible to theft, hence the desire to use adhesives, stakes, and other ways to secure the mats. While all the mats in the prior art claim to be of sufficient weight to prevent movement because of weather and general maintenance around the mats such as mowing, the fact that all require some type of securing or staking indicates otherwise.

What is needed is a weed barrier mat that is flat, durable, simple to install, requires no adhesive or stakes to maintain its installed position, deters theft, and uses recycled tires in a way that is minimally impactful on the environment.

DISCLOSURE OF INVENTION

In a first aspect of the invention, a weed barrier mat made of tire tread sections cut from used tires is comprised of a lower mat having a first mat portion and a second mat portion, each of the mat portions comprised of at least two tire sections arranged in parallel. The tire sections have a width and a length, with the mat portions formed by positioning the lengths adjacent one another, with the abutting sections being innermost tire sections creating a linear void at the abutted sections of the mat portions. A series of slits are cut into the innermost lower tire section immediately on either side of the linear void to form a central slit array. An upper mat positioned over the lower mat is made of a pair of upper tire sections, each upper tire section of the pair having an upper length, an upper width, and an upper depth, and arranged on top of the lower mat such that the lower widths of the lower mat are perpendicular to the upper widths of the upper mat. The pair of upper tire sections are in spaced apart relationship with a gap between them, the gap sized and shaped such that the central slit array is accessible through the gap in the upper tire sections. A slit is formed through an entire width of a lower tire section width of at least one of the first mat portion or the second mat portion to bisect the lower tire section width. The slit is positioned below an upper tire section. The upper mat is removably affixed to the lower mat with a plurality of corrosion-resistant fasteners positioned at fastener locations in the upper mat and penetrating the lower mat.

In a second aspect of the invention, the weed barrier mat is modular with upper and lower laps allowing mats to be joined together by a lap joint.

In yet a third aspect of the invention, the upper and lower mats of the weed barrier mat are joined using corrosion-resistant staples.

In yet a fourth aspect of the invention, a method of installing the weed barrier mat comprising the steps of positioning an upper tire section adjacent to a post installed into a ground surface, unfastening the upper tire section from the lower mat, lifting the upper tire section to expose the slit, widening the slit by lifting at least one portion of the mat on either side of the slit, maneuvering the weed barrier mat around the post so that the post enters the widened slit area and moves into the central slit array, returning the slit to its original size and position, repositioning the upper tire section to its original position, and refastening the upper mat to the lower mat. In an alternative step, a quantity of landscape fabric is positioned in the central slit array after the step of maneuvering and before the step of returning.

In yet a fifth aspect of the invention, the step of refastening is further comprised of at least one of applying adhesive or installing fasteners removed during the step of unfastening.

In yet a sixth aspect of the invention, the method of installing the weed barrier mat comprises the steps of positioning the weed barrier mat in a desired location, positioning the second weed barrier mat such that the lower lap is immediately below the upper lap of the weed barrier mat, fastening the upper lap and lower lap together using corrosion resistant fasteners, and repeating the steps of positioning, positioning and fastening of additional weed barrier mats until a desired overall mat length is achieved.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
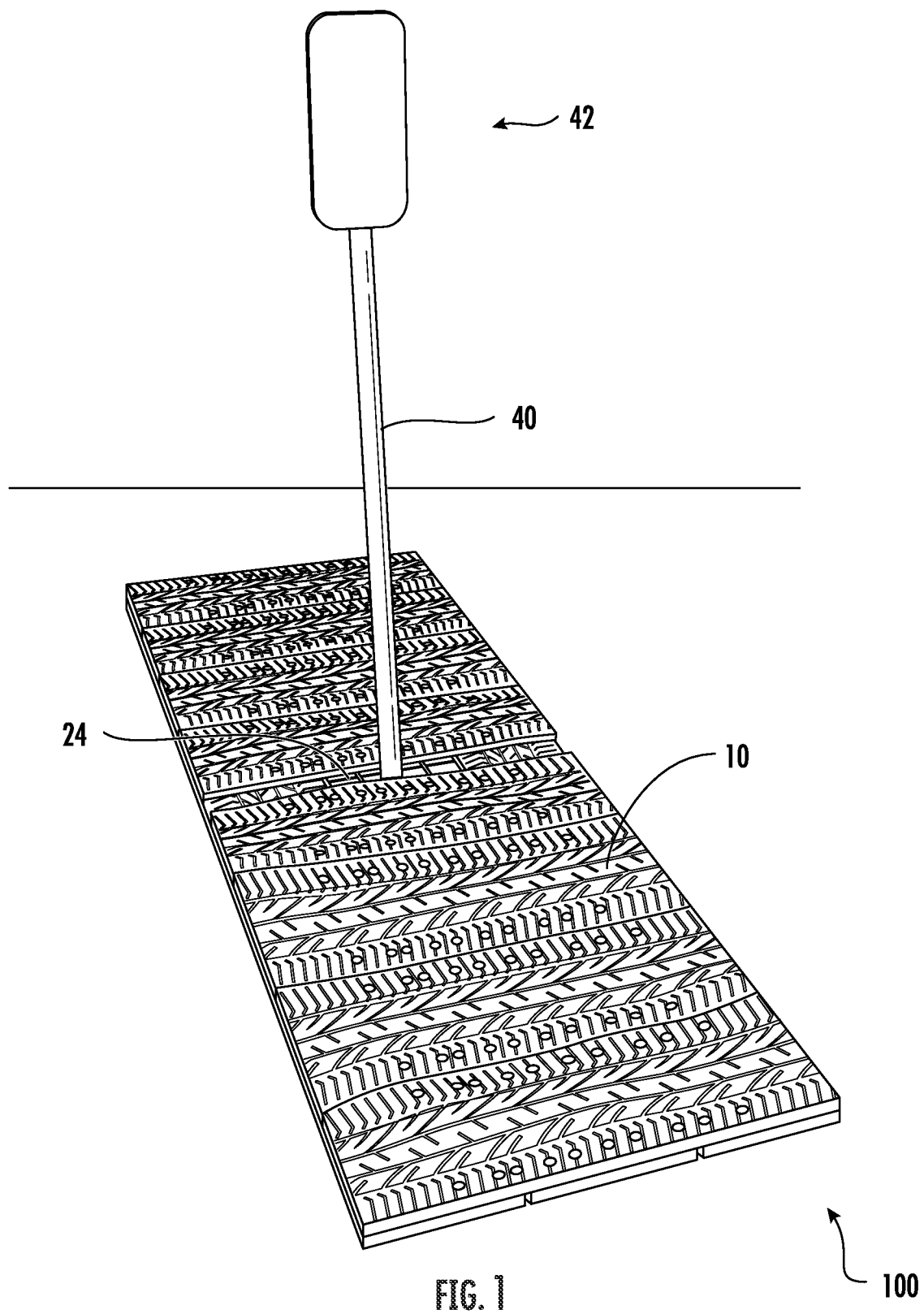
FIG. 1 is a perspective view of a weed barrier mat shown installed around a sign post.
Figure 2:
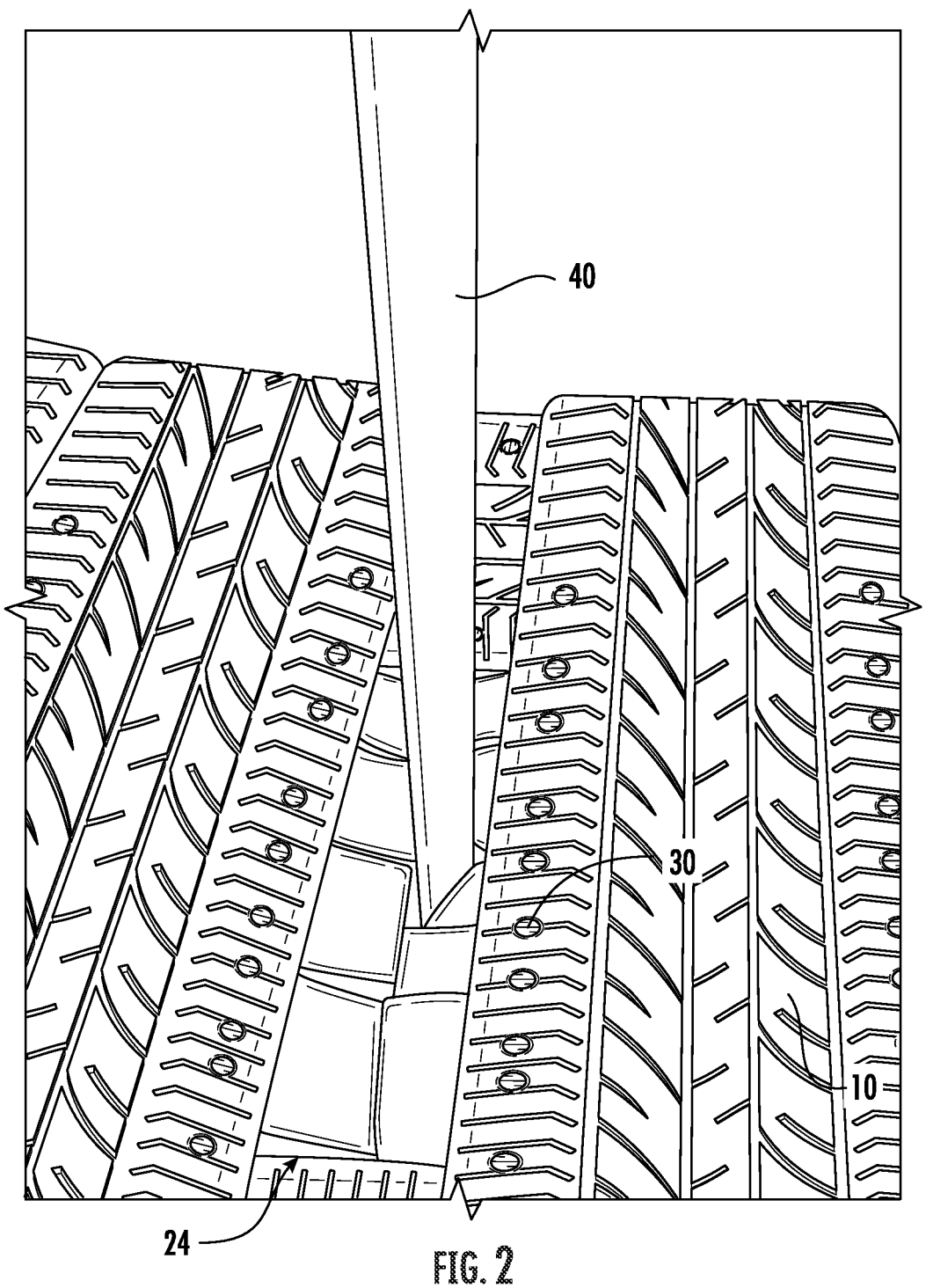
FIG. 2 is a top view of the weed barrier mat and sign post in FIG. 1, showing a central slit array of the weed barrier mat.
Figure 3:
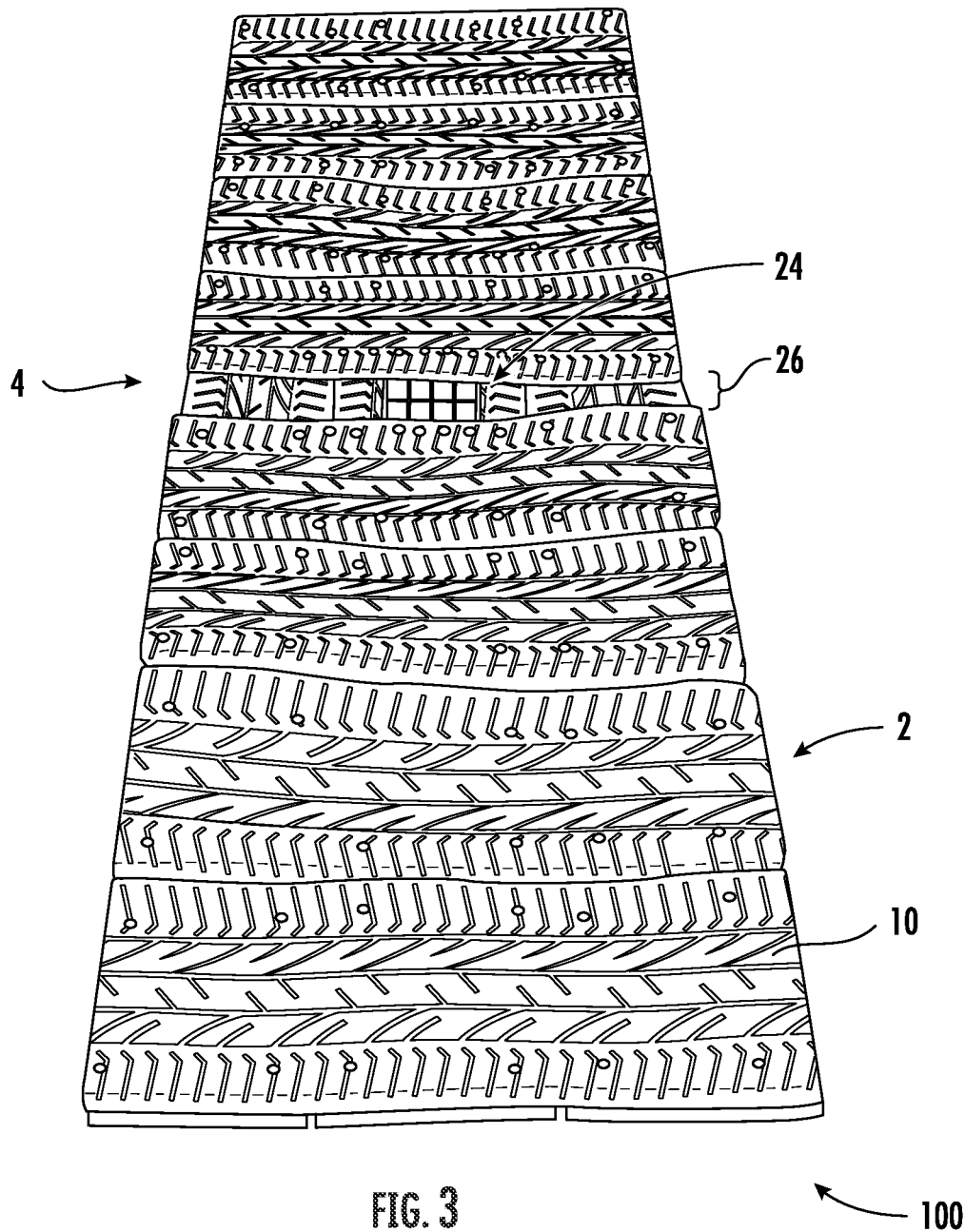
FIG. 3 is a top view of the weed barrier mat in FIG. 1, shown in an uninstalled position.

The following is a list of reference labels used in the drawings to label components of different embodiments of the invention, and the names of the indicated components.

100 mat
2 upper mat
4 lower mat
10 upper tire section
10*a* upper width
10*b* upper length
20 outer tire section
20*a* outer width
20*b* outer length
20*c* inner tire section
20*d* inner width
20*e* inner length
22 slit
24 central slit array
26 gap
30 fastener
30*a* staple
32 fastener location
40 post
42 sign
50 fence
52 fence chain or panel
54 bottom of fence panel
56 fence gap
58 lap joint
60 lower lap
62 upper lap

DETAILED DESCRIPTION

A weed barrier mat according to the invention or mat 100 is shown in FIGS. 1-14. Turning to FIG. 1, the mat 100 is comprised of an upper mat 2 and a lower mat 4. The upper mat 2 is made of a pair of upper tire sections 10, each upper tire section 10 of the pair having an upper width 10a and an upper length 10b, where the upper lengths 10b are oriented so as to be parallel to one another, and the pair of upper tire sections 10 positioned in spaced apart relationship over the lower mat 4 such that a gap 26 exists between the pair of upper tire sections 10. The gap 26 is sized and shaped to expose a central slit array 24 cut into the lower mat 4. In the embodiment shown in the Figures, the upper mat 2 is further comprised of additional upper tire sections 10 positioned adjacent the pair of upper tire sections 10 and on either side of the gap 26, with the embodiment shown featuring eight upper tire sections. Fastener locations 32 are formed into the upper tire sections 10 that are sized and shaped to receive fasteners 30 which are ideally galvanized or otherwise weatherproof and durable. Suitable fasteners include galvanized screws or stainless steel staples 30a, for a tool-installed method, and clevis pin-clip fasteners, for a tool-free installation method. The fasteners 30 must be longer than a depth of the upper tire section so that they penetrate the lower mat 4. In the case of fasteners such as clevis pin-clips, the fastener 30 must be long enough to penetrate the depth of the upper tire section and a depth of the lower mat 4. An embodiment of the mat 100 for fences 50 is shown in FIGS. 10-14.

Figure 4:
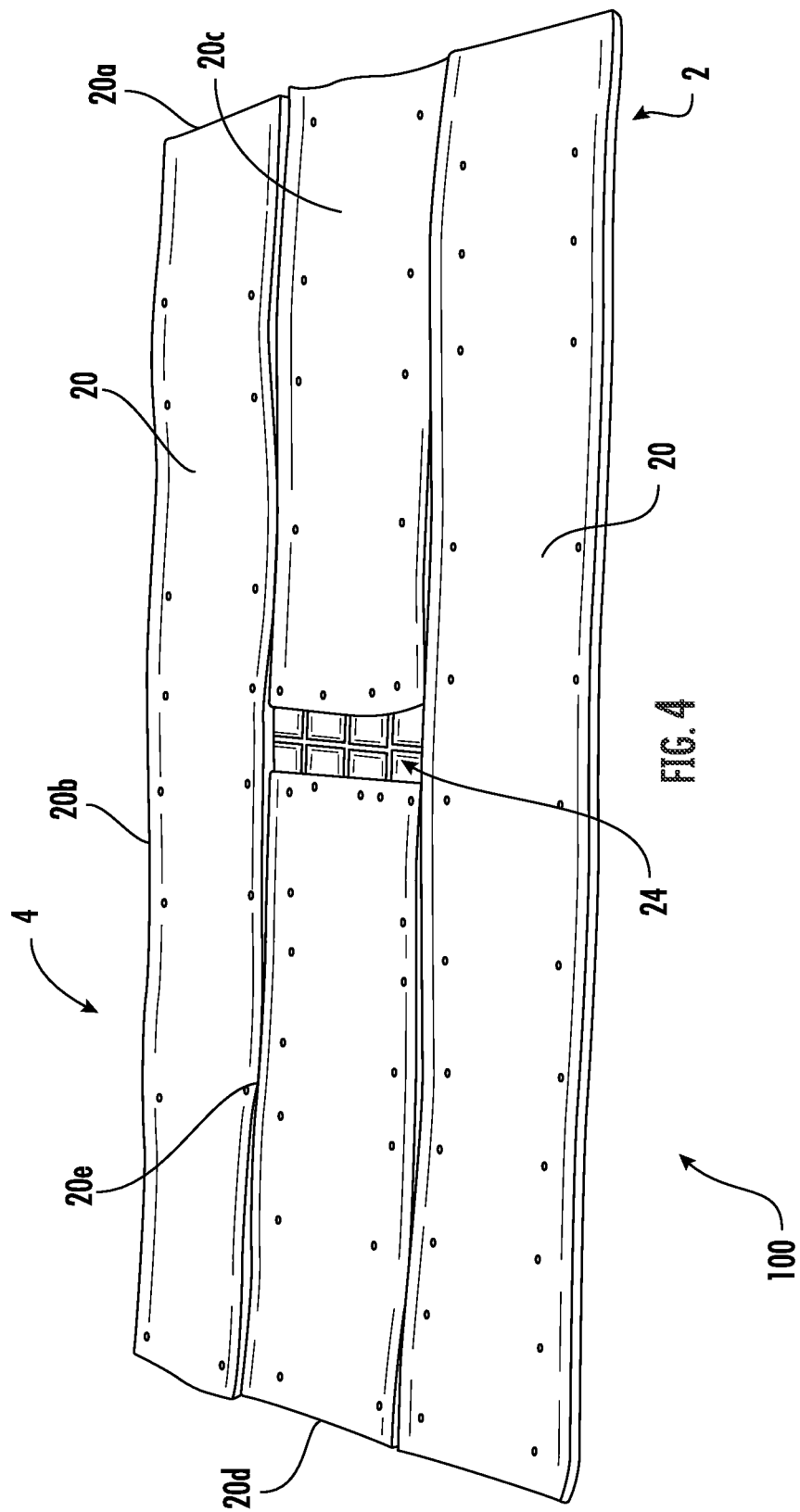
FIG. 4 is a bottom view of the weed barrier mat in FIG. 3.
Figure 5:
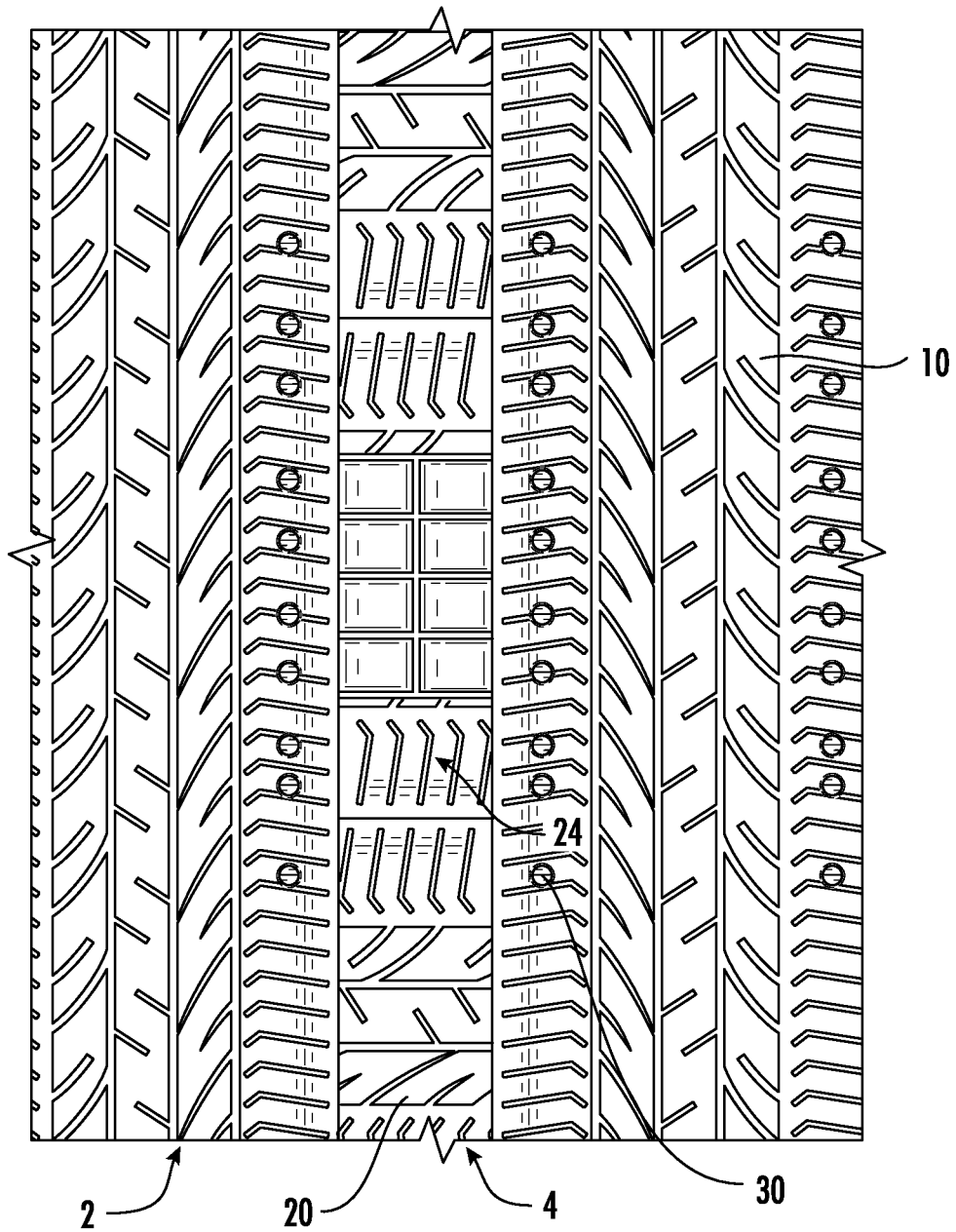
FIG. 5 is a top view of the central slit array in FIG. 2.
Figure 6:
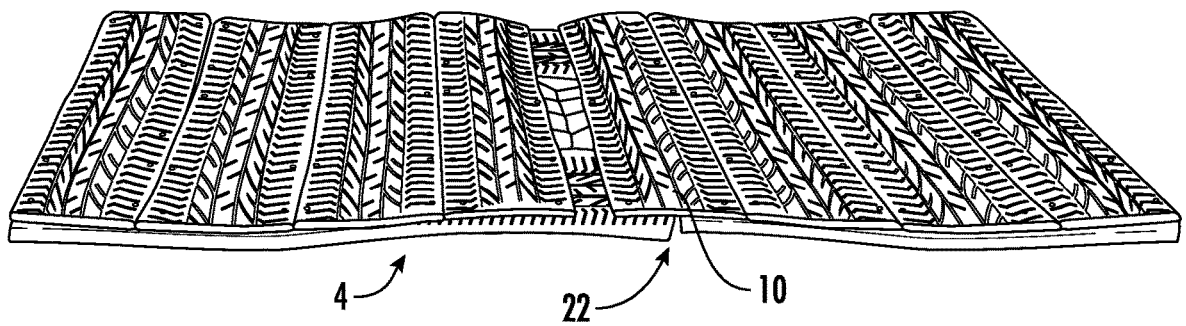
FIG. 6 is a perspective view of the weed barrier mat in FIG. 1, highlighting a removable upper tire section adjacent the central slit array.
Figure 7:
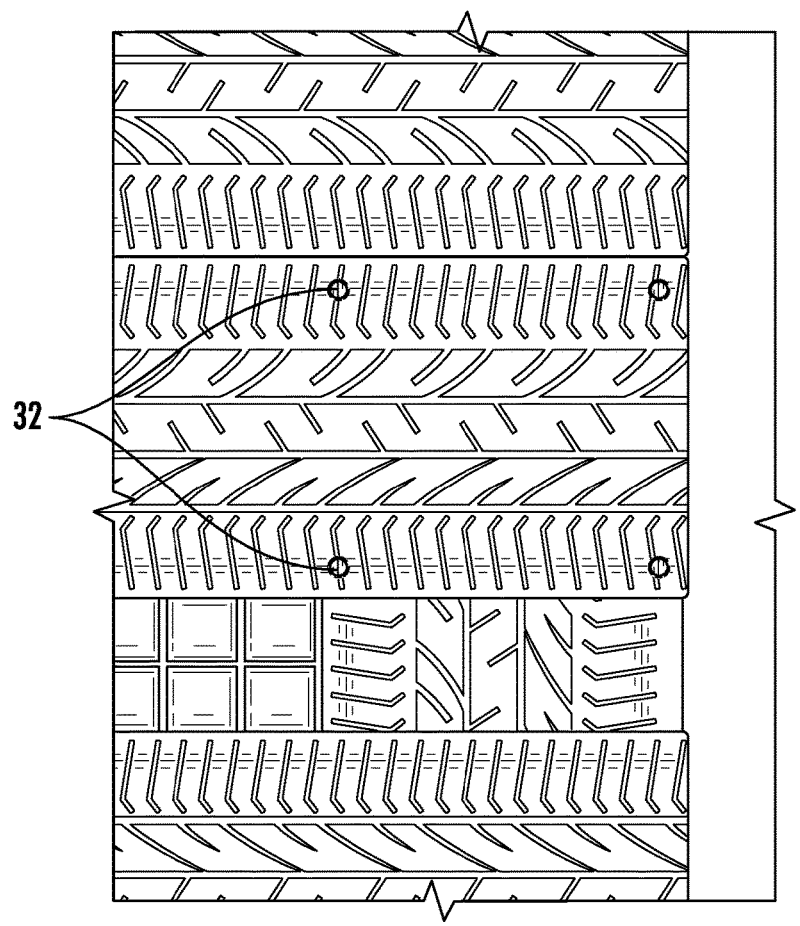
FIG. 7 is a top view of the fastener locations formed into the upper tire section.
Figure 8A:
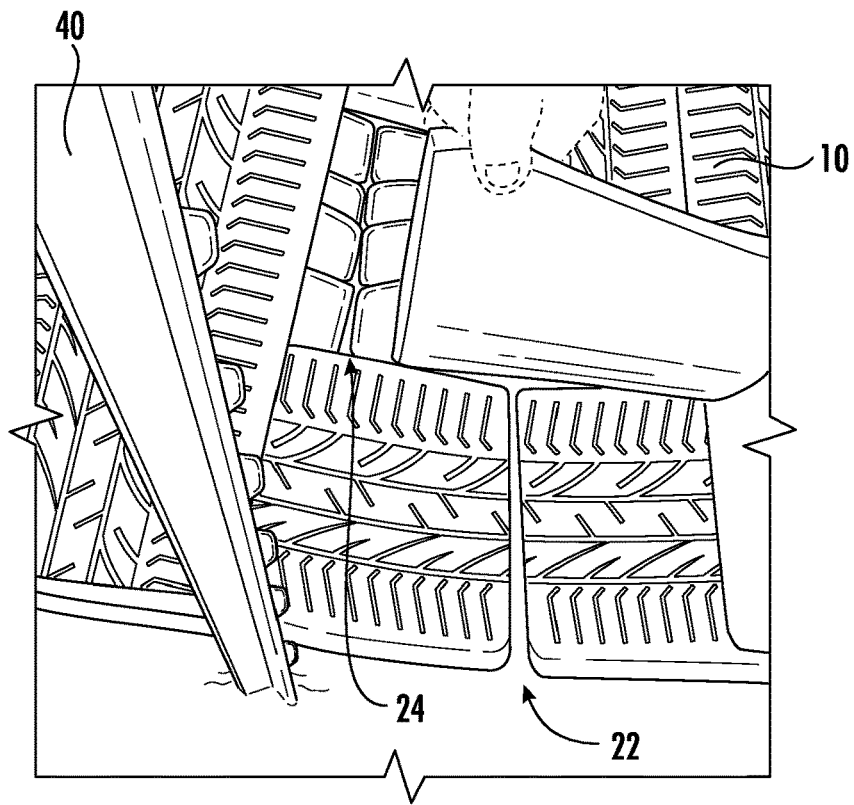
FIG. 8A is a top view of the upper tire section of the upper mat shown in FIG. 1, where the unfastened upper tire section is lifted to show the slit in the lower tire section of the lower mat.
Figure 8B:
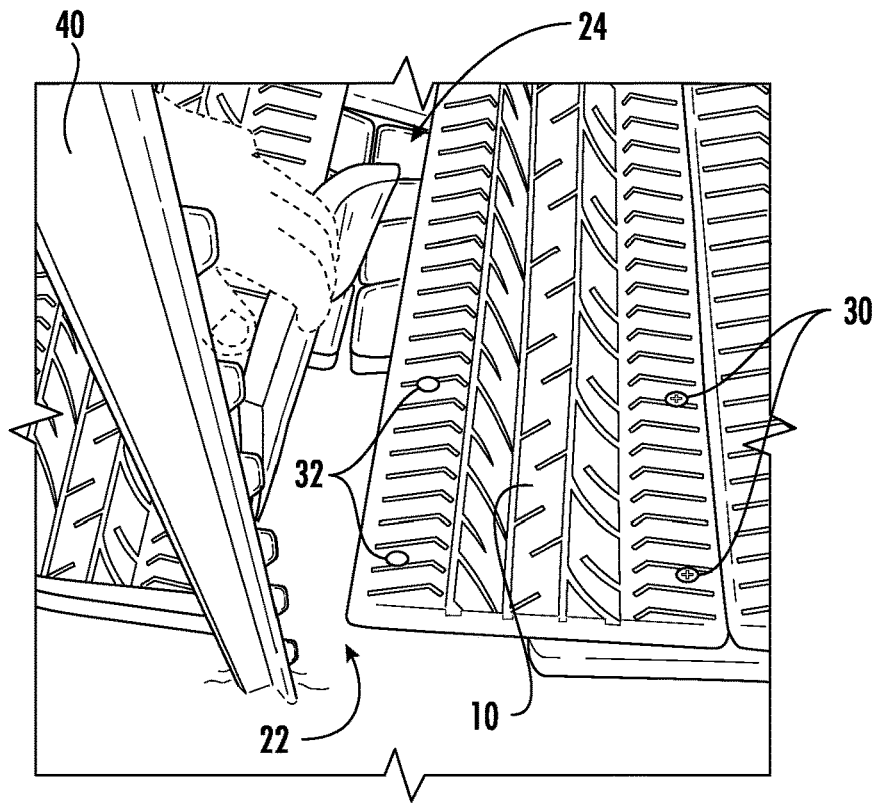
FIG. 8B is a top view of the weed barrier mat in FIG. 8A, shown with one portion of the lower tire section lifted to widen the slit to allow entry of the post.
Figure 9:
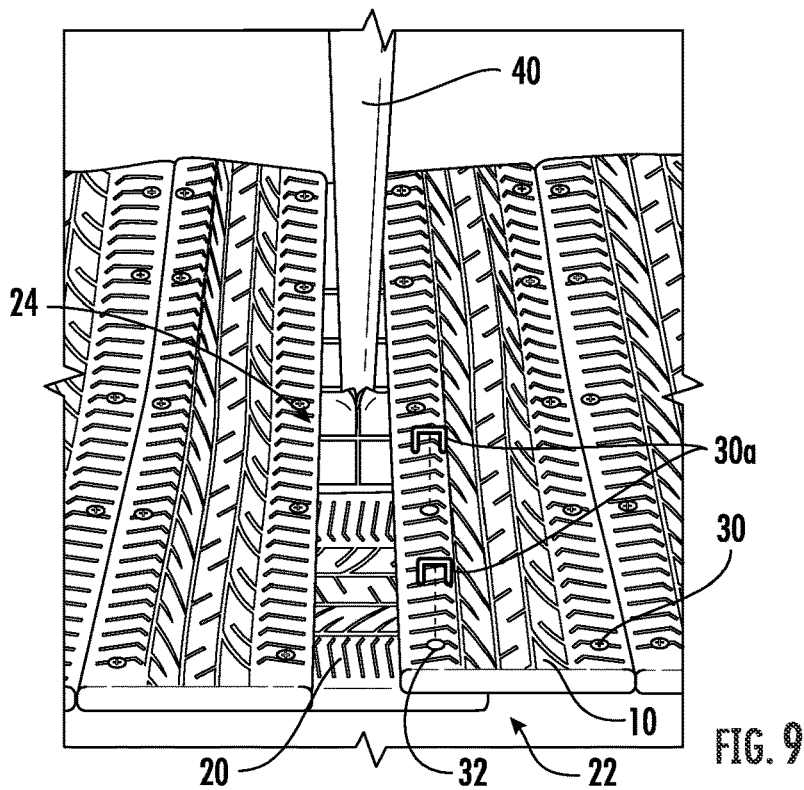
FIG. 9 is a top view of an installed weed barrier mat, after the upper tire section is replaced and resecured to the lower tire section.

The lower mat 4 is comprised of at least two outer tire sections 20 and an inner tire section 20c sandwiched between the outer tire sections 20. The outer tire sections 20 have an outer width 20a and an outer length 20b, and the inner tire section 20c similarly has an inner width 20d and an inner length 20e. The outer length 20b of each outer tire section 20 may be a same length or different lengths within a same lower mat 4. The inventor notes that as used tire treads are cut into rectangular sections to be used for the mat 100, all the inner and outer lengths 20e 20b and inner and outer widths 20b 20d may vary, and hence the embodiment shown in the Figures is representative only and not meant to limit the upper tire sections 10 and the outer and inner sections 20 10 to those represented and in fact, the upper and lower mats 2 4 may include multiple tire sections 10 20 to create a mat 100. While a width of each tire section may vary, an overall width and length of the mat 100 is typically a uniform or predetermined size to allow for modular application. Mats 100 of varying standardized sizes are available to allow an installer the ability to choose the mat or mats appropriately sized for the desired application. The outer tire section 20 on either side of the central slit array 24 may be formed with a slit 22 cut across the outer width 20a as shown in FIG. 8A, or the slit 22 may in fact be a space between each terminal end of a pair of outer tire sections 20 abutting each other, as shown in FIG. 4. In some embodiments, a plurality of fastener locations 32 aligned with the fastener locations 32 in the upper mat 2 are formed into the lower mat 4 for ease of use and to allow alignment of the mats 2 4 to secure them to one another.

To use the mat 100, the fasteners 30 are removed from the fastener locations 32 in the upper tire section adjacent the gap 26 and the central slit array 24. The upper tire section 10 is lifted to reveal the slit 22. The mat 100 is then positioned so a post 40 of a sign 42 or guardrail (not shown) is positioned adjacent the slit 22, and the post 40 is guided through the slit 22 into the central slit array 24. The upper tire section 10 is then returned to its original position and the fasteners 30 are returned to their respective fastener locations 32, securing the upper mat 2 to the lower mat 4. An alternative step is to add a small section of landscape fabric around the post 40 prior to positioning the post 40 into the central slit array 24. The mat 100 is then adjusted around the post 40 in the central slit array 24 to a desired location and the mat 100 is fully installed. In some embodiments, such as for guard rails (not shown), multiple mats 100 are installed side by side to create a continuous mat beneath the guard rail. In those embodiments, a single mat 100 may be comprised of more tire sections than what is shown in the Figures and may include two or more gaps 26 and central slit arrays 24 to accommodate multiple posts 40.

The inventor notes that the use of existing tire treads that are simply cut from used tires limits the environmental impact of the mats 100 since the only processing required is cutting, arranging and forming a hole into the sections and hence there is no chemical processing required, very little heat or energy required, and no special tools, equipment or skills needed to manufacture these mats 100. The used tires are free material that currently is stockpiled in garbage dumps and other locations. As the mats 100 are not uniform in appearance and are most definitely made of old tires, theft is deterred since these are clearly "used" or "upcycled" products that are suitable for highways and industrial fence lines but are otherwise non-decorative and non-desirable elsewhere and thus there is little motivation to steal these mats 100. The embodiment shown in the Figures is made of 8 upper tire sections and at least 4 outer and inner sections for the lower mat, using approximately seven tires' worth of tread material. The mat 100 in the embodiment shown in the Figures weighs approximately 75 pounds and thus is not easily shifted accidentally by cars running over the edge of the mat, or debris buildup, and its weight deters would-be thieves or even cars driving on it from shifting easily. The weight also means that staking or other attempts to secure the mat 100 to the ground are unnecessary. Given that the mats 100 are made of sections, the mats 100 are easily modified and scaled up or down in size and shape as needed. The tire sections 10 20 can be arranged plank-style or in a variety of different patterns as needed or desired, including more artistic patterns such as herringbone and any other patterns common to bricklaying or floor planks. Since the mats 100 are comprised of tire sections, several mats can be joined together by removing tire sections of two adjacent mats, for instance an upper tire segment of one mat and a corresponding lower outer tire segment of a second mat and the remaining upper and lower mats aligned and fastened together accordingly. In other embodiments, multiple mats are positioned side by side without joining them together, and the mass of each mat maintains its position. Tires of different width treads can also be used and mixed and matched together to form the mat 10.

Figure 10:
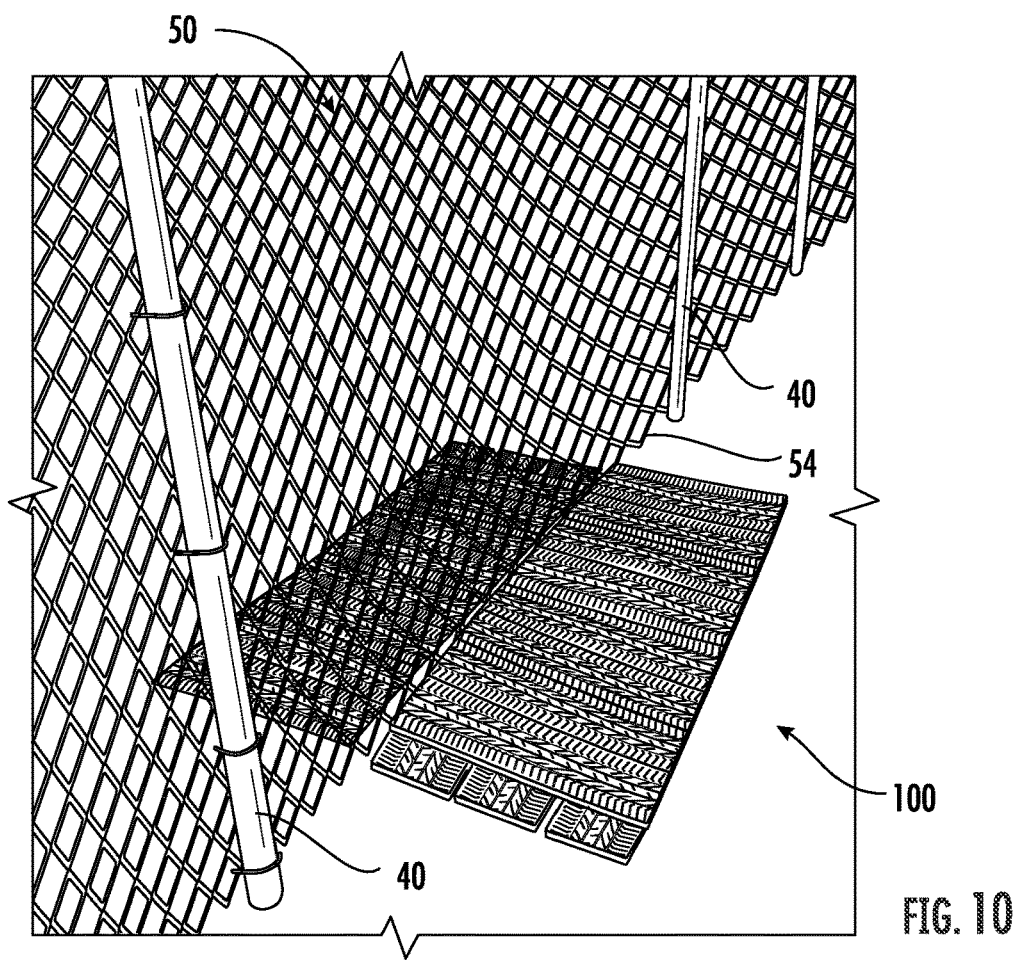
FIG. 10 shows a pair of weed barrier mats installed on either side of a section of fence panel, where a bottom of the fence panel is immediately adjacent a ground surface.
Figures 11, 12:
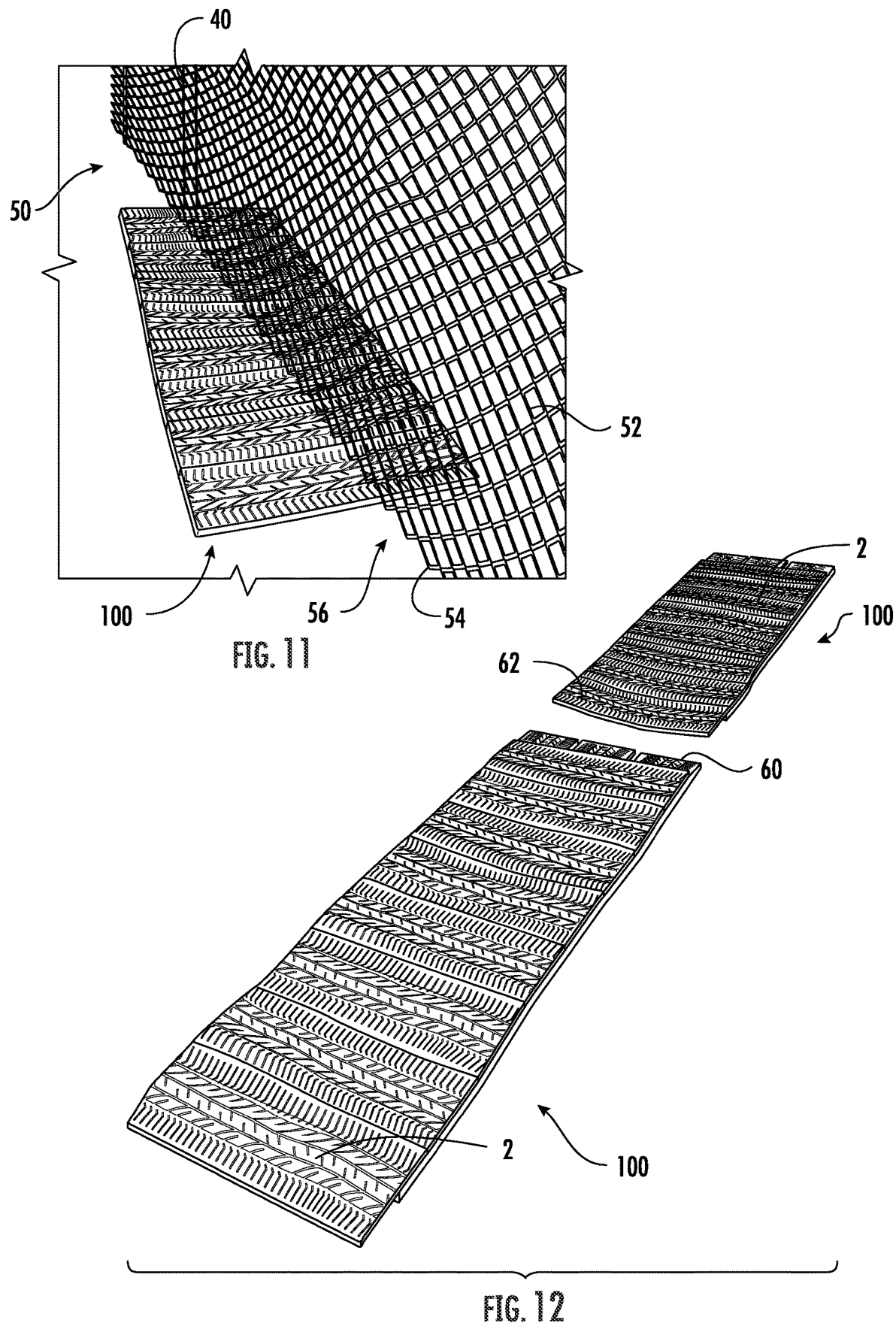
FIG. 11 shows a single weed barrier mat positioned under the bottom of the fence panel, where a gap exists between the bottom of the fence panel and the ground surface.
FIG. 12 is a perspective view of a pair of weed barrier mats and an exploded lap joint formed at abutting ends of the weed barrier mats.
Figure 13:
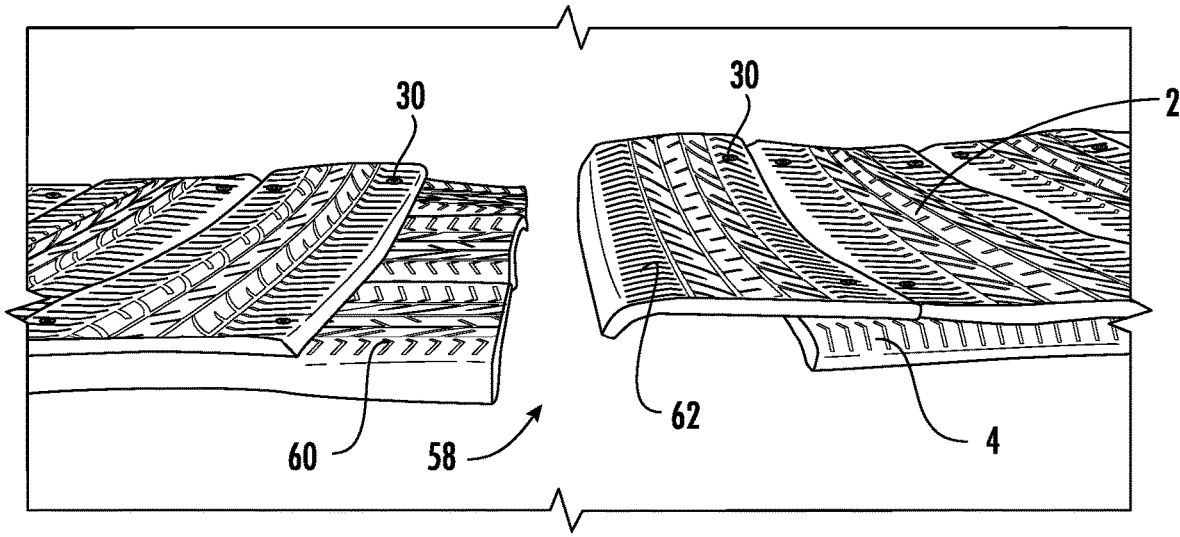
FIG. 13 is a side exploded view of the lap joint in FIG. 12.
Figure 14:
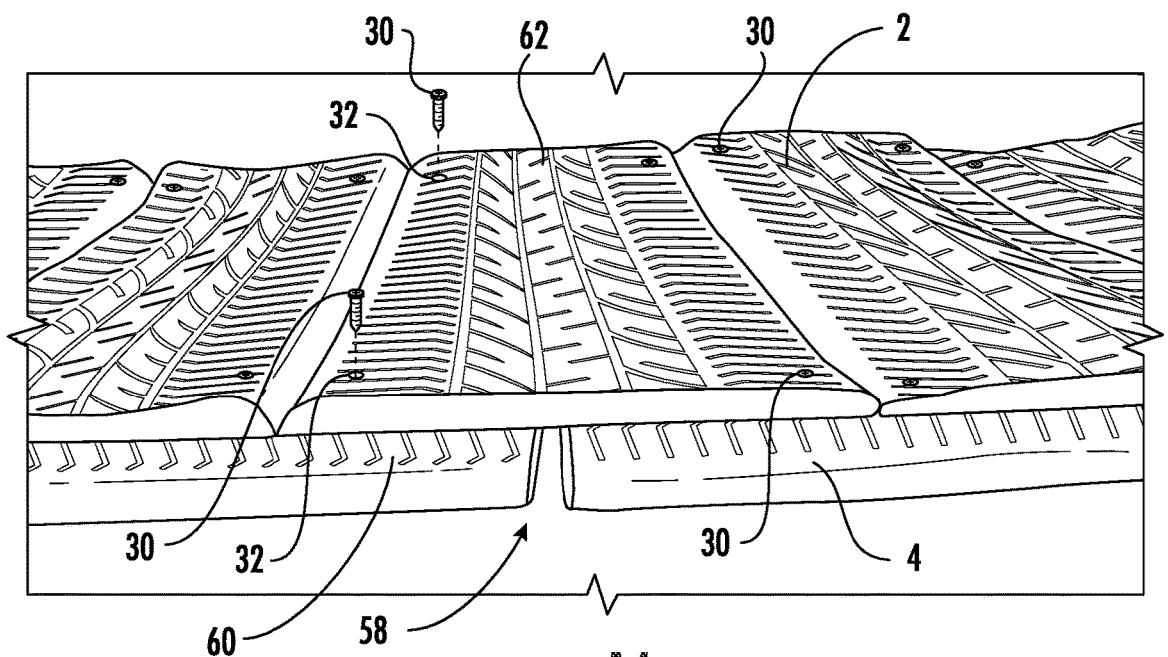
FIG. 14 is a side view of the lap joint in FIG. 13, shown with the upper lap secured to the lower lap.

The inventor notes that airports, landfills, wastewater treatment plants, chemical plants, refineries and correctional facilities all have large areas enclosed by many miles of fencing that must be kept clear of brush and other vegetation and thus are subjected to large amounts of herbicide use and/or the use of manually operated, small engine powered trimming equipment, on a regular basis. In FIGS. 10-14, the mat 100 is shown adjusted for fences 50. The mat 100 is shown with a lap joint 58 joining two mats 100 together. A first mat has an upper lap 62 consisting of a terminal end upper tire section and a lower lap at its opposed end consisting of a terminal end lower tire section. A second mat is similarly formed with an upper lap 62 and a lower lap 60. Positioning the upper lap 62 of the first mat over the lower lap 60 of the second mat and fastening them together via the fastener locations 32 and fasteners 30 creates a weed barrier mat whose length can be extended as desired. The mat 100 can thus be adjusted in size to cover these large fence line areas, with or without the gap 26 and central slit array 24 in areas without sign and signal posts, and with the gap 26 and central slit array 24 for use around posts along the base of the fence lines. In FIG. 10, the fence 50 is shown with a fence panel 54 and a bottom of the fence 54 immediately adjacent a ground surface. The mat 100 is thus positioned on either side of the bottom of the fence 54. In FIG. 11, where a gap 56 exists between the bottom of the fence 54 and the ground surface, multiple mats 100 joined via the lap joints 58 are positioned below the bottom of the fence 54. This is an especially useful way of upcycling the millions of used tires that are produced annually and are currently disposed of in landfills or dumped illegally along roadsides. Given the durability of tires, a one-time installation of the mats 100 would provide many years of weed barrier functionality and save many thousands of gallons of herbicides from being used and/or emissions being produced from small engine powered trimming equipment, much to the benefit of the environment and human health and safety.

It is to be understood that the above-described arrangements are only illustrative of the application of the principles of the present invention. Numerous modifications and alternative arrangements may be devised by those skilled in the art without departing from the scope of the present invention.

I claim:

1. A weed barrier mat made of tire tread sections cut from used tires, comprising:
    a lower mat having a first mat portion and a second mat portion, each of the first mat portion and second mat portion comprised of a pair of lower tire sections having a lower length and a lower width arranged such that the lower widths of the first mat portion are in parallel arrangement with the lower widths of the second mat portion;
    wherein the pair of lower tire sections are further comprised of an innermost lower tire section and an outermost lower tire section;
    a linear void formed by positioning the innermost lower tire section of the first mat portion adjacent the innermost lower tire section of the second mat portion;
    a series of slits cut into the innermost lower tire section immediately on either side of the linear void so as to form a central slit array;
    an upper mat having a pair of upper tire sections, each upper tire section of the pair having an upper length, an upper width, and an upper depth, and arranged on top of the lower mat such that the lower widths of the lower mat are perpendicular to the upper widths of the upper mat;
    wherein the pair of upper tire sections are in spaced apart relationship to form a gap sized and shaped such that the central slit array is accessible through the gap;
    a slit formed through an entire width of a lower tire section width of at least one of the first mat portion or the second mat portion so as to bisect the lower tire section width;
    wherein at least one of the at least two upper tire sections is positioned over the slit;
    a plurality of fastener locations in the upper mat; and
    a plurality of corrosion-resistant fasteners removably securing the upper mat to the lower mat at the plurality of fastener locations.

2. The weed barrier mat in claim 1, wherein the upper mat is comprised of at least three upper tire sections.

3. The weed barrier mat in claim 1, further comprising a fastener location on the upper tire section at least one of immediately adjacent the gap or directly above the slit.

4. The weed barrier mat in claim 1, wherein at least one of the plurality of corrosion-resistant fasteners is a staple.

5. The weed barrier mat in claim 1, wherein the upper mat is further comprised of an upper lap tire section positioned over the outermost lower tire section of one of the first mat portion or the second mat portion of the lower mat such that a portion of the upper lap tire section overhangs the outermost lower tire section.

6. The weed barrier mat in claim 5, wherein at least one of the first mat portion or the second mat portion of the lower mat is further comprised of a lower lap tire section on an opposite side of the weed barrier mat having the upper lap tire section.

7. The weed barrier mat in claim 6, wherein the lower lap is sized and shaped to be removably affixed to an upper lap of a second weed barrier mat having a same upper lap and lower lap configuration as the weed barrier mat.

8. A method of installing the weed barrier mat in claim 1, comprising the steps of:
    positioning an upper tire section adjacent to a post installed into a ground surface;
    unfastening the upper tire section from the lower mat;
    lifting the upper tire section to expose the slit;
    widening the slit by lifting at least one portion of the mat on either side of the slit;
    maneuvering the weed barrier mat around the post so that the post enters the widened slit area and moves into the central slit array;
    returning the slit to its original size and position;
    repositioning the upper tire section to its original position; and
    refastening the upper mat to the lower mat.

9. The method in claim 8, wherein the step of unfastening is further comprised of removing fasteners securing the upper tire section to the lower tire section.

10. The method in claim 9, further comprising the step of:
    removing the fasteners securing the upper tire section of the upper mat to the lower mat;
    after the step of positioning.

11. The method in claim 9, further comprising the step of:
    positioning a second weed barrier mat immediately adjacent the weed barrier mat;
    after the step of refastening.

12. The method in claim 8, further comprising the step of positioning a quantity of landscape fabric in the central slit array after the step of maneuvering and before the step of returning.

13. The method in claim 8, wherein the step of refastening is further comprised of installing fasteners to reconnect the upper tire section to the lower tire section.

14. A weed barrier mat, comprising:
    an upper mat having a first upper tire section and a second upper tire section, each of the first upper tire section and second upper tire section having a pair of opposed side widths perpendicular to a pair of opposed side lengths, the first upper tire section and second upper tire section arranged such that one of the pair of opposed side lengths of the first upper tire section and one of the pair of opposed side lengths of the second upper tire section are in parallel relationship and adjacent to one another with less than about a quarter inch gap between the adjacent opposed side lengths;

an upper mat joint created by the adjacent relationship of the first upper tire section and second upper tire section;

a lower mat having a first lower tire section and a second lower tire section, each of the first lower tire section and second lower tire section having a pair of opposed lower side widths perpendicular to a pair of opposed lower side lengths, the first lower tire section and second lower tire section arranged such that one of the pair of opposed lower side lengths of the first lower tire section and one of the pair of opposed lower side lengths of the second lower tire section are in parallel relationship and adjacent to one another with less than about a quarter inch gap between the adjacent opposed lower side lengths;

a lower mat joint created by the adjacent first lower tire section and second lower tire section, the joint located at a center position of the lower mat; and a corrosion-resistant fastener attaching the upper mat to the lower mat;

wherein the upper and lower mats are arranged such that the first upper tire section is centered over the lower mat joint with the side lengths of the first upper tire section parallel to the lower side lengths of the lower tire sections;

wherein the second upper tire section is attached to either the first lower tire section or to the second lower tire section but not to both;

wherein an unattached portion of the second upper tire section forms an upper lap;

wherein the upper mat and the lower mat are comprised of tire treads obtained from used tires; and wherein an unattached portion of one of the first lower tire section or second lower tire section forms a lower lap.

15. The weed barrier mat in claim 14, wherein either the adjacent upper tire sections abut one another or the adjacent lower tire sections abut one another, or both the adjacent upper tire sections abut one another and the adjacent lower tire sections abut one another.

16. The weed barrier mat in claim 14, further comprising a spike receiving aperture formed into the upper lap.

17. The weed barrier mat in claim 16, further comprising a spike sized and shaped to fit into the spike receiving aperture.

18. The weed barrier mat in claim 14, wherein the upper and lower tire sections are approximately rectangular.

19. A weed barrier mat, comprising:

an upper tire section having a pair of side widths and a pair of side lengths, and a longitudinal centerline visually dividing the upper tire section into two halves;

a lower tire section having a pair of lower side widths and a pair of lower side lengths, and a lower longitudinal centerline visually dividing the lower tire section into two lower halves;

wherein the pair of side lengths of the upper tire section and the pair of lower side lengths have an approximately same length measurement; and a corrosion-resistant fastener;

wherein the upper tire section is positioned on top of the lower tire section such that the longitudinal centerline is aligned with one of the pair of side lengths of the lower tire section, with one of the two halves of the upper tire section attached to one of the two lower halves of the lower tire section by the fastener at an overlapping area of the upper tire section and the lower tire section;

an upper lap formed by an unattached half of the two halves of the upper tire section; and a lower lap formed by an unattached lower half of the two lower haves of the lower tire section.

20. The weed barrier mat in claim 19, further comprising a second mat having an upper tire section and a lower tire section configured in a same way as the weed barrier mat; and a second corrosion-resistant fastener;

wherein an upper lap of the second mat is positioned over a lower lap of the second mat and fastened thereto by the second fastener; and wherein the upper tire section of the weed barrier mat is either abutting or adjacent the upper tire section of the second mat with a gap between the upper tire section of the weed barrier mat and the upper tire section of the second mat being less than about a quarter inch in width.

21. The weed barrier mat in claim 19, wherein either the upper lap or the lower lap is further formed with a spike receiving aperture.

22. The weed barrier mat in claim 19, wherein the upper tire section is fastened to the lower tire section at each side width.

* * * * *